H. HUTCHINSON.
Manufacture of India Rubber Goods.
No. 31,391. Patented Feb. 12, 1861.
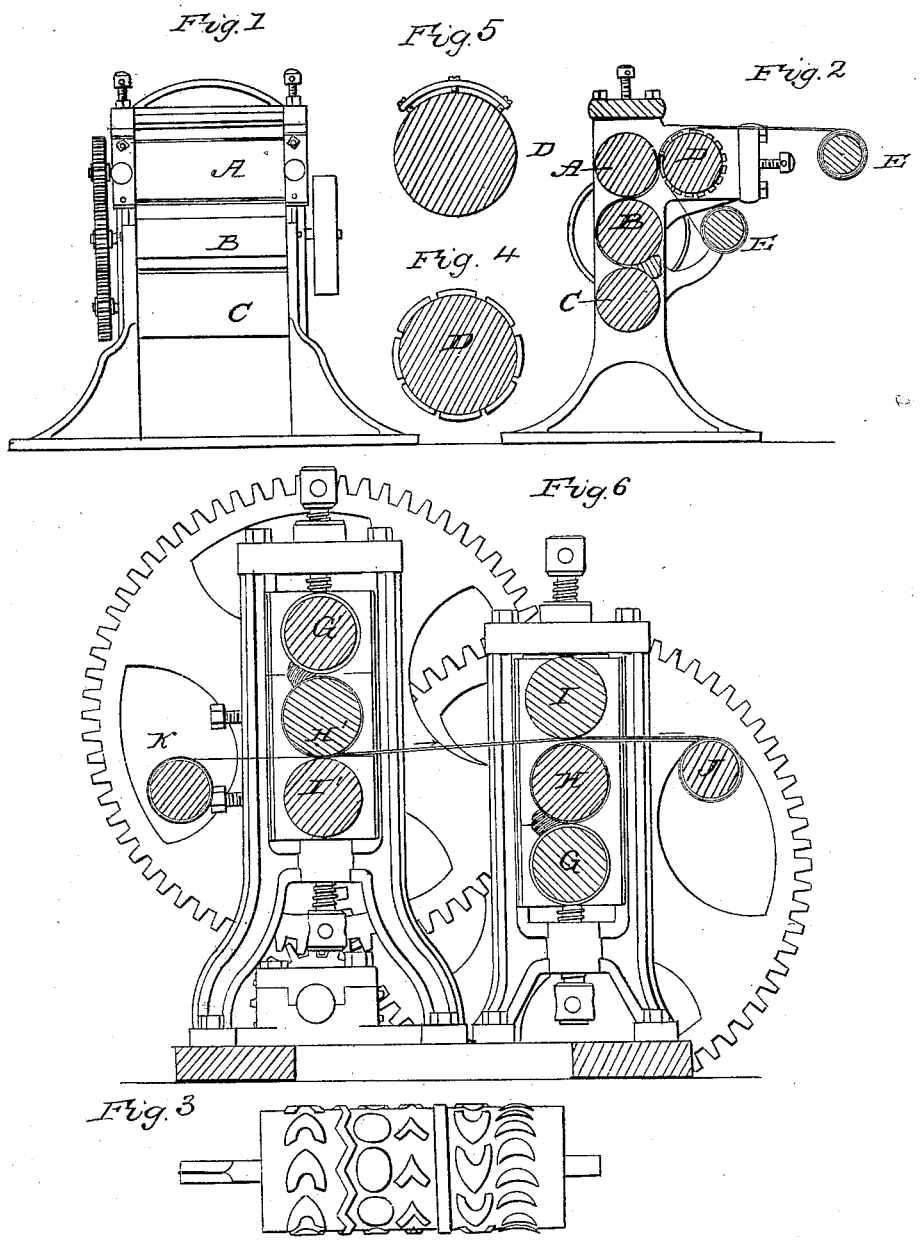

UNITED STATES PATENT OFFICE.

HIRAM HUTCHINSON, OF NEWARK, NEW JERSEY.

MANUFACTURE OF INDIA-RUBBER GOODS.

Specification of Letters Patent No. 31,391, dated February 12, 1861.

*To all whom it may concern:*

Be it known that I, HIRAM HUTCHINSON, of Newark, State of New Jersey, a citizen of the United States of America, have invented a new and Improved Machinery and Improvements in the Manufacture of India-Rubber Goods and other Gums; and I do hereby declare that the following is a true, full, and exact description thereof, reference being had to the accompanying drawings and to the letters of reference marked thereon.

The invention has for its object improvements in the manufacture of india rubber goods. In producing articles entirely or in part of cloth leather or other materials, coated or combined with india rubber it is usual to cut pieces of the shape necessary for the formation of the required article from a sheet of cloth, leather or other material coated over its whole surface with india rubber from which considerable waste of india rubber results. Now, according to my invention in coating sheets of cloth leather or other materials with india rubber when such sheets are to be cut up into shaped pieces, I only coat or combine such sheets with india rubber at certain places in pieces of the size and form required and this I do by passing the sheet of cloth leather or other material together with a sheet of india rubber prepared in the usual manner between rollers on one of which a raised pattern is formed or fixed and this raised pattern by pressing the sheet of cloth, leather or other material and the india rubber together causes the india rubber to coat or combine with the sheet of cloth leather or other material at the parts touched by the pattern while at the parts which receive no pressure no adhesion is produced between the cloth leather or other material and the india rubber.

To enable others skilled in the art to make and use my invention I will proceed to describe its construction and operation by reference to the accompanying drawing.

Figure 1 is a front view and Fig. 2 is a longitudinal section of a machine such as I prefer to employ for coating or covering a continuous sheet of cloth or other material with india rubber at places or patches of the size and form required for the manufacture of the articles for which the coated or covered fabric is required.

The machine consists of three plain rollers A, B, C, placed one over the other and geared together and driven as the drawing shows; the distances between these rollers can be adjusted by means of screws in the usual manner. The india rubber in a plastic state as it comes from the masticator is fed in between the lower pair of rollers B, C, Fig. 2, and is by them rolled out into a sheet which passes up around the center roller B and between it and the top roller A.

D, is the pattern roller, a side view of which upon a larger scale is shown at Fig. 3 and a transverse section at Fig. 4. The pattern may be either cast on the surface or may be attached by screws as is shown at Fig. 5. The roller D, is mounted on the frame in such a manner that its distance from the roller A may be adjusted as may be required according to the thickness of the covered fabric or material to be produced.

E, and F, are beams on which the fabric or material to be covered is wound; it passes continuously while the machine is at work from the lower beam E to the upper beam F, which is driven by cone pulleys or in any other convenient manner so that its surface speed may be at all times equal to that of the rollers A, B, C. The fabric or material in passing from the beam E, to the beam F, passes around the pattern roller D, and is brought into contact with the sheet of india rubber against which at parts it is strongly pressed by the raised or pattern surface of the roller and at such parts a complete adhesion or union between the india rubber and the fabric or material is obtained while the remaining portions of the india rubber are left on the roll.

Fig. 6, is a machine such as I prefer to employ for covering a continuous sheet of cloth or other material on both sides at certain parts only in the manner already described. It consists of two pairs of plain rollers G H and G' H' between each pair india rubber in a plastic state is fed which becomes rolled out into sheets and passes around the rollers H and H' and between them and the pattern rollers I and I' together with the fabric or material which passes continuously from the beam J, to the beam K. The beam K being driven as in Fig. 2.

In covering leather with india rubber as it cannot readily be made up into a continuous sheet to roll on the beams E, F, of the machine Figs. 1 and 2 or the beams J, K, of the machine Fig. 6, the skins are fed into the machine by a workman who enters the skins in succession between the rollers. In place of a pattern roller, two plain rollers may be employed and a pattern cut out or formed in suitable material may be passed together with the sheet of cloth, leather or other material and india rubber between the rollers.

What I claim as my invention and desire to secure by Letters Patent is—

Coating or combining india rubber or other gums with sheets of cloth, leather or other material in the places and of the forms required by the employment of pattern rollers substantially as herein described so that when the said sheets are cut up into shaped pieces of the required size and form the remainder of the cloth, leather or other material which becomes useless will not be coated or combined with the india rubber thereby producing great economy and great improvement in the goods.

HIRAM HUTCHINSON.

Witnesses:
  Henry W. Spencer,
  Geo. Hutton.